June 1, 1954  C. G. RICH  2,679,882
NONSKID DEVICE FOR VEHICLE WHEELS
Filed Nov. 29, 1949
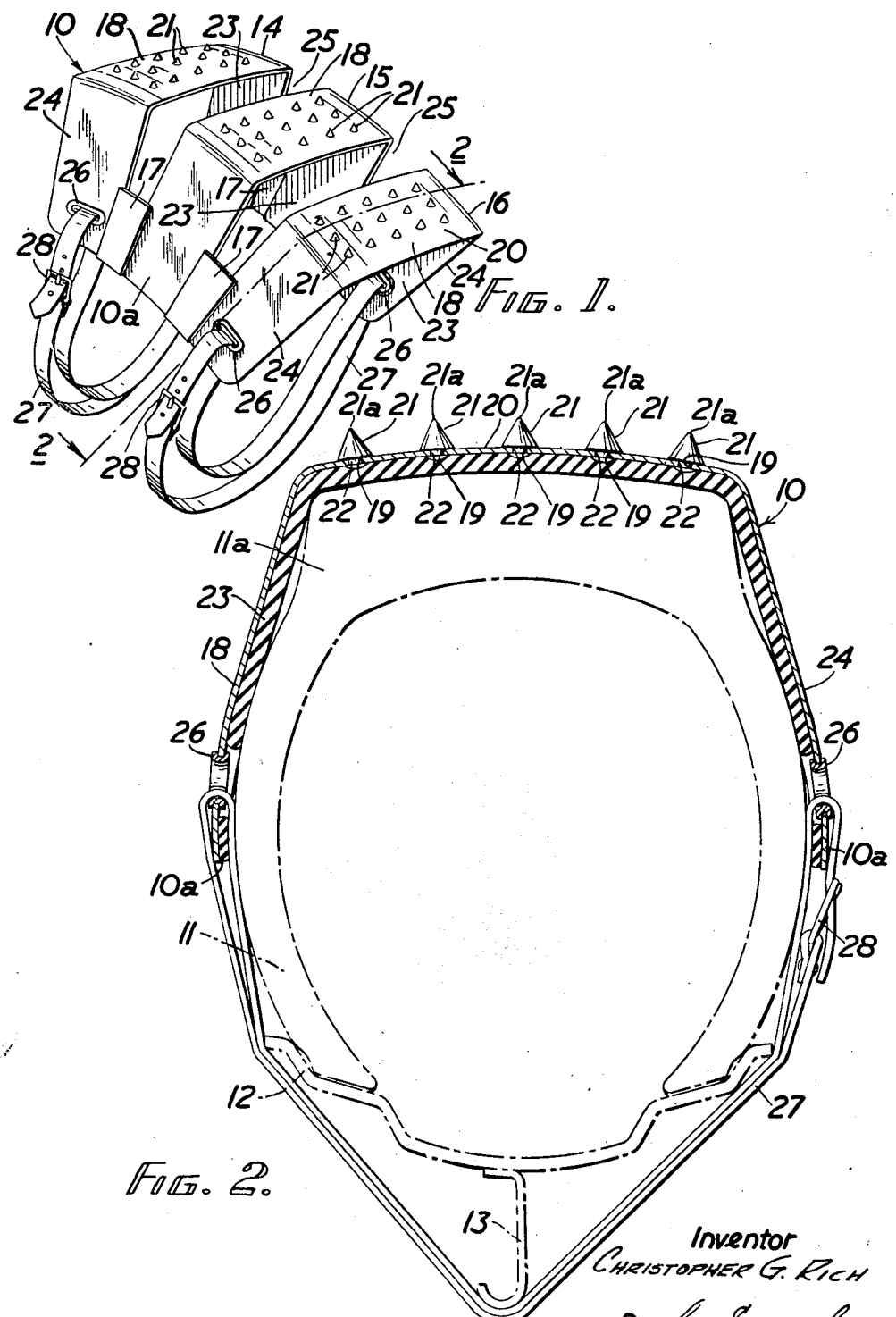
Inventor
CHRISTOPHER G. RICH
By *Young, Emery & Thompson*
Attorneys Patented June 1, 1954

2,679,882

UNITED STATES PATENT OFFICE 2,679,882

NONSKID DEVICE FOR VEHICLE WHEELS

Christopher Godfrey Rich, Cheltenham, England

Application November 29, 1949, Serial No. 129,943

5 Claims. (Cl. 152—222)

This invention relates to non-skid devices for vehicle wheels, more especially the wheels of self-propelled vehicles.

On such vehicles chains are frequently employed when snow, ice or mud is liable to be encountered in order to enable the driving wheels to obtain a grip on slippery surfaces. Chains suffer from the disadvantage, however, that they are noisy in use, whilst their tendency to fly outwards due to centrifugal force necessitates a comparatively large clearance between the periphery of the road wheels and other parts of the vehicle. In addition, the chains having a chafing effect upon the tyres of the vehicle.

The object of the invention is to provide a non-skid device which is simple and effective in use and which does not suffer from the disadvantages associated with the use of chains.

According to the invention a non-skid device for vehicle wheels comprises a transversely flexible member adapted to be detachably secured to a road wheel and to conform to its periphery, the said flexible member having a multiplicity of headed elements with their heads embedded therein so that portions of the elements project outwardly therefrom and bite into the road surface.

Preferably the projecting portions of the headed elements are substantially conical in shape. The flexible member is advantageously formed from thin, flexible sheet metal and the heads of the headed elements comprise reduced shank portions which are secured in a tread portion of the flexible member.

If desired, an inner layer of rubber or rubber-like material may be secured to the inner surface of the flexible member so that such layer is interposed between the heads of said elements and the tyre of the vehicle.

The flexible member may be of arcuate shape whether viewed in elevation or in cross-section and be provided with at least one radially arranged slot which extends outwardly along its flanks and transversely across its periphery.

A preferred embodiment of the device adapted for use with a motor vehicle having spoked or perforated wheels will now be described, by way of example, with reference to the accompanying drawings, in which:

Figure 1 is a perspective view of the flexible member showing the straps by which it is secured in place on the tyre and wheel of the motor vehicle which are not illustrated in this view, and Figure 2 is a cross-sectional view of the flexible element substantially on the line 2—2 of Figure 1, but showing a section of the tyre and wheel of the vehicle with the flexible member secured thereto.

Referring to the drawings the flexible member is in the form of a gaiter or shoe 10 of arcuate cross-section adapted to fit round the periphery of the tyre 11 with the inner edges 10a of the flanks of the shoe lying adjacent the walls of the tyre and disposed substantially centrally between its tread 11a and the rim 12 of the road wheel 13, as shown in Figure 2. The shoe 10 comprises three separate sections 14, 15 and 16 of substantially the same circumferential length which are spaced apart by a distance approximately half such length and are connected together towards the inner edges of their flanks by gusset plates 17. In the form illustrated, the shoe 10 is of laminated construction and the outer layer 18 of each section of the shoe 10 is composed of thin, flexible, spring sheet metal, for example steel, and is provided with a multiplicity of apertures 19 arranged at substantially equally spaced intervals along the central or tread portion 20. A conical stud 21 having a reduced head or shank portion 22 is mounted in each of the apertures 20, the studs being secured by passing the shank portions through the apertures and riveting or welding them in position therein so that the points 21a of the studs project outwardly to bite the road surface.

As shown clearly in Figure 2, the inner layer 23 of the laminated shoe is formed of sponge rubber sheet and is secured by means of an adhesive to the inside surfaces of the tread portion 20 and flanks 24 of each of the separate sections 14, 15 and 16 of the shoe. The gusset plates 17 which connect the separate sections together are of considerably less depth than the flanks 24 of the separate sections and are welded or otherwise rigidly secured to the inner portions of the latter so that a slot 25 is left between each of the sections 14, 15 and 16 which slot extends radially outwardly along the flanks and transversely across the tread portion of the shoe 10. This form of construction ensures that the shoe has sufficient flexibility in the transverse sense to allow it to closely embrace the tyre whilst the rigid mutual relationship in which the sections 14, 15, 16 are held by the gusset plates 17 prevents these sections tipping when their forward edges make contact with the road surface. It will be appreciated that the sections 14, 15, 16 are held in inclined relationship to each other so that the flanks of each section are radially arranged with respect to the wheel on which they are mounted. An elongated eyelet 26 is arranged towards the inner end of each flank 24 of the outer sections 14, 16 of the shoe through which a looped strap 27 having a buckle 28 is passed, the straps passing inside the rim 12 of the road wheel 13 between the spokes or through the perforations in the wheel and securing the shoe in place.

In use three or four of the shoes 10 are secured at equally spaced intervals around the periphery of each road wheel 13 and the points 21a of the projecting studs 21 bite into the road surface each time one of the shoes comes into contact therewith. Due to the transverse flexibility of the shoe 10 the conical studs 21, when taking the weight of the vehicle, are pressed inwardly into the sponge rubber layer 23 whilst the tyre 11 also yields inwardly so that there is no appreciable "bump" as each shoe comes into contact with the road surface. It has been found in practice that the outer layer 18 may advantageously be made of steel having a thickness of .018 to .020 inch whilst the thickness of the sponge rubber inner layer 23 is approximately one sixteenth of an inch, the total sectional thickness of the tread portion of the device from the inner surface of the inner layer to the points 21a of the studs being approximately three eighths of an inch. It is obviously important that this total thickness should be kept as small as possible in order to ensure that the device is silent in use and that no "bump" is appreciable when the shoes 10 come into contact with the road surface. In this connection the flexible nature of the spring steel from which the shoe is constructed allows the tread portions of the sections 14, 15, 16 to adapt themselves to the short arcs of the tread of the tyre, the amount of such movement required being not more than a few thousandths of an inch at most.

If desired, in order to reduce the total thickness of the shoe 10, the inner layer 23 of sponge rubber may be dispensed with so that the spring sheet metal shoe 10 is mounted directly on the tyre.

I claim:

1. A non-skid device for vehicle wheels comprising a plurality of separate spaced sections of substantially arcuate cross-section and formed from thin spring steel so that the elements are flexible in the transverse sense, each of such elements having flanks and a tread portion extending transversely between such flanks, a multiplicity of conical elements having reduced shank portions which are secured in apertures in each of said tread portions with the conical portions protruding outwardly therefrom, rigid gusset plates of less depth than said flanks which are fixedly secured to the free ends of the latter and attach said sections together in rigid spaced relationship to leave a gap between each section of less width than the circumferential width of the section and with the flanks of each section radially arranged with respect to a road wheel on which the device is mounted, and spaced straps secured towards opposite ends of the device which project inwardly therefrom and which are adapted to pass inside the rim of the road wheel.

2. A non-skid device for vehicle wheels comprising in combination a flexible member of laminated construction adapted to be detachably secured to a road wheel and of arcuate shape both in elevation and in cross-section, said member having flanks of substantial depth which lie adjacent the walls of the tyre and render the device rigid in the circumferential sense and which are connected by a tread portion having at least one radially arranged slot which extends outwardly across the outer edges of the flanks and transversely across the tread portion to divide the latter into separate sections of substantially the same circumferential width which are spaced apart by a distance approximately half such width, the member comprising an outer layer of thin flexible spring steel and an inner layer of rubber-like material secured to said outer layer, a multiplicity of conical elements secured to said outer layer with the conical portions of the said elements protruding outwardly, and spaced straps secured to the outer ends of the flanks of the flexible member which project inwardly therefrom and are adapted to pass inside the rim of the road wheel, and secure the device to the latter at separate circumferentially spaced points.

3. A non-skid device for vehicle wheels comprising in combination a member formed from thin flexible sheet metal and adapted to be detachably secured to a road wheel, said member being of substantially arcuate shape both in elevation and cross-section and having flanks which lie adjacent the walls of the tyre with their inner edges disposed substantially centrally between the tread of the tyre and the rim of the wheel and a tread portion connecting said flanks so that the device is flexible in the transverse sense but is rigid in the circumferential sense due to the depth of the flanks, said tread portion having at least one transversely arranged slot which extends thereacross between the flanks and divides the tread portion into a plurality of separate similar sections each of greater circumferential width than the slot, a multiplicity of conical elements having reduced shank portions which are secured in apertures formed in the tread portion of said member with the conical portions of the elements protruding outwardly therefrom, and spaced straps secured towards opposite ends of the flanks of said member and projecting radially inwards therefrom which are adapted to pass inside the rim of the road wheel and secure the device to the latter at separate circumferentially spaced points.

4. A non-skid device for vehicle wheels comprising in combination a member adapted to be detachably secured to a road wheel and of substantially arcuate shape both in elevation and in cross-section, said member being formed from thin spring steel so that it is flexible in the transverse sense, and having flanks of substantial depth which lie adjacent the walls of the tyre and render the device rigid in the circumferential sense due to the depth of such flanks which are connected by a tread portion having at least one radially arranged slot which extends outwardly across the outer edges of the flanks and transversely across the tread portion to divide the latter into separate sections of substantially the same circumferential width which are spaced apart by a distance approximately half such width, a multiplicity of headed elements secured to the tread portion of said sections of the member by their heads so that portions of the headed elements project outwardly from said sections to bite into the road surface, and spaced attachment means towards the outer ends of the flanks of the member whereby the latter is secured to the wheel at circumferentially spaced points.

5. A non-skid device according to claim 3, wherein the sheet metal from which the device is formed is spring steel having a thickness of from .018 to .040 inch.

References Cited in the file of this patent

UNITED STATES PATENTS

| Number | Name | Date |
|---|---|---|
| 1,250,866 | Harrison | Dec. 18, 1917 |
| 1,361,022 | Cucchiara | Dec. 7, 1920 |
| 1,615,154 | Anderson | Jan. 18, 1927 |
| 1,655,508 | Odean | Jan. 10, 1928 |
| 1,719,746 | Baker | July 2, 1929 |
| 2,532,380 | Tschohl | Dec. 5, 1950 |

FOREIGN PATENTS

| Number | Country | Date |
|---|---|---|
| 100,339 | Switzerland | Aug. 1, 1923 |